United States Patent
Inoue et al.

(10) Patent No.: US 8,919,862 B2
(45) Date of Patent: Dec. 30, 2014

(54) ROOF APPARATUS FOR VEHICLE

(71) Applicants: Yuichi Inoue, Aichi-gun (JP); Toru Taiko, Kariya (JP); Wataru Yamaguchi, Chita-gun (JP)

(72) Inventors: Yuichi Inoue, Aichi-gun (JP); Toru Taiko, Kariya (JP); Wataru Yamaguchi, Chita-gun (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/625,095

(22) Filed: Sep. 24, 2012

(65) Prior Publication Data

US 2013/0076065 A1    Mar. 28, 2013

(30) Foreign Application Priority Data

Sep. 26, 2011 (JP) ................................. 2011-209024
Jun. 20, 2012 (JP) ................................. 2012-138999

(51) Int. Cl.
*B62D 35/00* (2006.01)
*B62D 25/06* (2006.01)

(52) U.S. Cl.
CPC ................ *B62D 35/00* (2013.01); *B62D 25/06* (2013.01)
USPC .......................... 296/180.1; 296/213; 296/210

(58) Field of Classification Search
USPC ........................ 296/213, 210, 180.1
See application file for complete search history.

(56) References Cited

U.S. PATENT DOCUMENTS

| | | | |
|---|---|---|---|
| 6,305,740 B1 | 10/2001 | Staser et al. | |
| 7,055,897 B2 * | 6/2006 | Ozkok et al. | 296/210 |
| 2004/0031831 A1 | 2/2004 | Henderson | |
| 2006/0290169 A1 * | 12/2006 | Fukushima et al. | 296/180.1 |
| 2007/0235590 A1 * | 10/2007 | Kokoshkin et al. | 244/130 |
| 2009/0021053 A1 * | 1/2009 | Harberts et al. | 296/213 |

FOREIGN PATENT DOCUMENTS

| | | |
|---|---|---|
| EP | 1 808 365 | 7/2007 |
| FR | 2 632 595 | 12/1989 |
| FR | 2 690 117 | 10/1993 |
| JP | 4-8681 | 1/1992 |
| JP | 6-127438 | 5/1994 |
| JP | 4161201 | 12/2004 |
| JP | 2012-96602 | 5/2012 |
| WO | WO 01/56836 | 8/2001 |

OTHER PUBLICATIONS

Extended European Search Report for European Appl. No. 12185834.4 dated Sep. 3, 2014.

* cited by examiner

*Primary Examiner* — Dennis H Pedder
*Assistant Examiner* — Beverly Becker
(74) *Attorney, Agent, or Firm* — Finnegan, Henderson, Farabow, Garrett & Dunner, LLP

(57) ABSTRACT

A roof apparatus for a vehicle includes first and second projecting members each mounted on a roof of the vehicle and each including an elongated shape. The first and second projecting members are arranged at first and second end portions of the vehicle in a width direction of the vehicle. A height of each of the first and second projecting members is equal to or greater than a height of an upper end of a boundary layer of an airflow flowing on the roof.

9 Claims, 7 Drawing Sheets

US 8,919,862 B2

ROOF APPARATUS FOR VEHICLE

CROSS REFERENCE TO RELATED APPLICATIONS

This application is based on and claims priority under 35 U.S.C. §119 to Japanese Patent Application 2011-209024, filed on Sep. 26, 2011 and Japanese Patent Application 2012-138999 filed on Jun. 20, 2012, the entire contents of which are incorporated herein by reference.

TECHNICAL FIELD

This disclosure generally relates to a roof apparatus for a vehicle.

BACKGROUND DISCUSSION

A roof apparatus for a vehicle that reduces an air resistance while the vehicle is being driven is disclosed in JP4161201B (which will be hereinafter referred to as Reference 1), for example. The roof apparatus disclosed in Reference 1 includes plural bumps (protrusions) at a rear portion on a roof of a vehicle. Each of the plural bumps has a height specified in consideration of a boundary layer of airflow flowing on the roof and includes a shape achieved by a half of a spheroid divided at a surface including a longitudinal axial line of the spheroid. The plural bumps are substantially arranged side by side in a width direction of the vehicle. In a case where the vehicle is driven, airflow flowing on the roof forms two pieces of longitudinal vortex at a rear side of the bumps because of the shapes of the bumps. A separation point of air is thus shifted to the rear side of the vehicle from around a boundary between an outer surface of the roof and an outer surface of a rear body of the vehicle. As a result, a pressure (an atmospheric pressure) in the rear of the rear body of the vehicle increases, i.e., a negative pressure is cancelled by atmospheric pressure recovery to thereby decrease a coefficient of air resistance (cd value) of the vehicle as a whole.

In addition, another roof apparatus for a vehicle is disclosed in JP04-8681A (which will be hereinafter referred to as Reference 2). The roof apparatus disclosed in Reference 2 includes fins arranged at left and right side portions of the vehicle so that each upper edge of the fins projects diagonally outwardly in the width direction of the vehicle. Each of the fins continuously extends along a boundary portion between a side surface and an upper surface of the vehicle from a roof end to a rear deck end in a longitudinal direction of the vehicle. A cross sectional shape of a connection portion between the side surface of the vehicle and the fin is substantially formed into an outward recess. Accordingly, airflow flowing over the upper edge of each of the fin from the side surface of the vehicle generates a vortex and a negative pressure at a leeward side of the fin to thereby press a rear portion of a vehicle body to the leeward side of the fin. As a result, a yawing moment caused by a cross wind is cancelled. A coefficient of lift decreases (i.e., a grip increases) and a driving stability of the vehicle increases accordingly.

Nevertheless, according to the roof apparatus disclosed in Reference 1, airflow flowing through the side surface of the vehicle is likely to join the boundary layer serving as a slow-speed airflow flowing in the vicinity of the outer surface of the roof between the most outward bump in the width direction of the vehicle and a roof ridge line of the roof at the most outward side in the width direction of the vehicle. Therefore, an effect to move the separation point of air to the rear side of the vehicle from the vicinity of the boundary layer may be reduced. A pressure increase at the rear side of the rear body of the vehicle is restrained, which may lead to a low fuel consumption.

In addition, according to the roof apparatus disclosed in Reference 2, airflow flowing from a fender (the side surface) to the rear deck (the rear body) by overriding the fin (i.e., the projecting member) generates the vortex at the leeward side of the fin. Thus, the leeward side of the fin tends to be the negative pressure to thereby push the rear portion of the vehicle to the leeward side (the rear portion of the vehicle is pulled to the leeward side). As a result, a forward driving force by an engine of the vehicle is reduced, which may lead to a low fuel consumption.

A need thus exists for a roof apparatus for a vehicle which is not susceptible to the drawback mentioned above.

SUMMARY

According to an aspect of this disclosure, a roof apparatus for a vehicle includes first and second projecting members each mounted on a roof of the vehicle and each including an elongated shape. The first and second projecting members are arranged at first and second end portions of the vehicle in a width direction of the vehicle. A height of each of the first and second projecting members is equal to or greater than a height of an upper end of a boundary layer of an airflow flowing on the roof.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
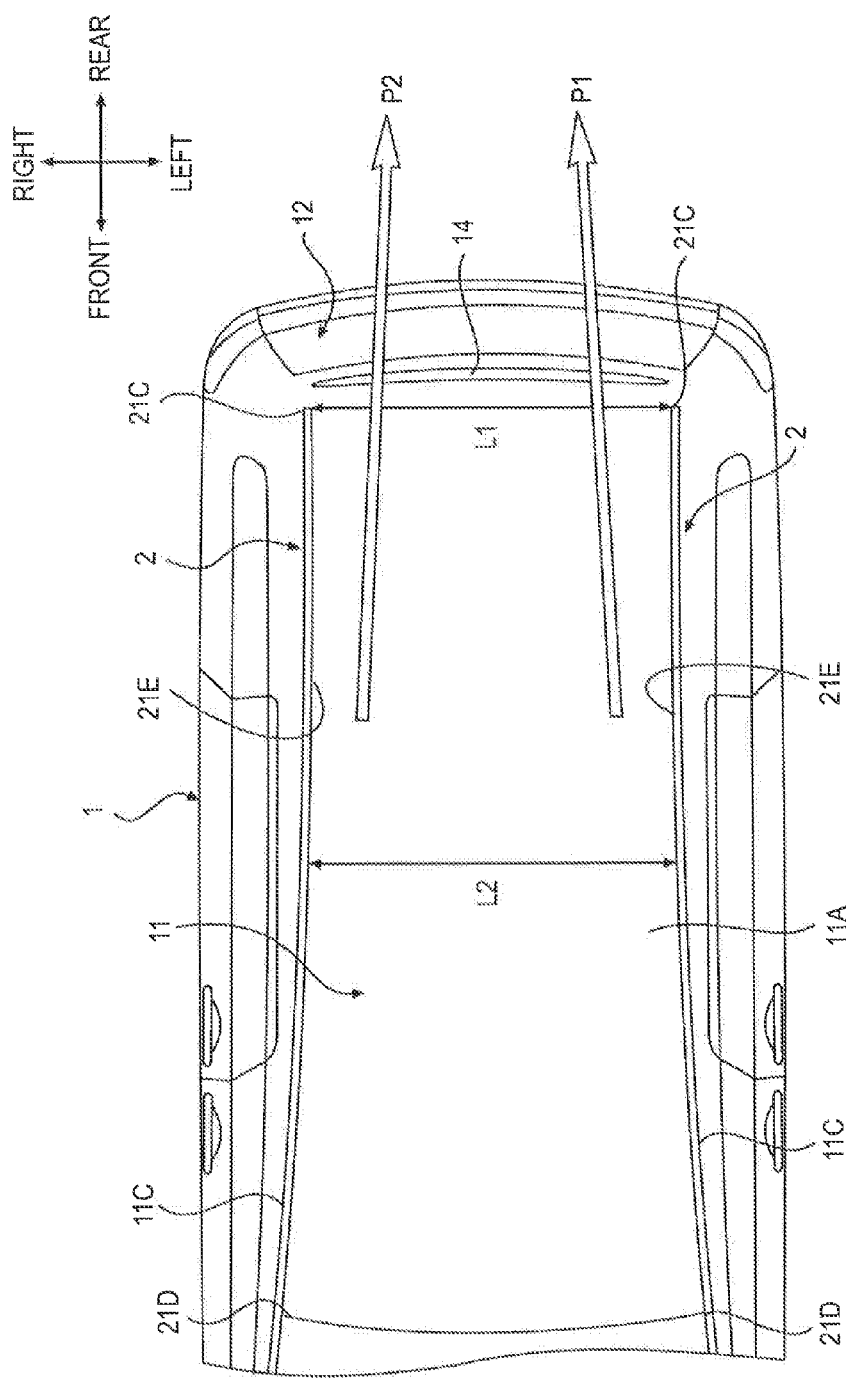
FIG. 1 is a plan view of a vehicle where a roof apparatus for a vehicle according to an embodiment is applied.

An embodiment will be explained with reference to the attached drawings. In the embodiment, directions and orientations such as left, right, front, rear, top, and bottom correspond to those when viewed from a passenger in a vehicle.

As illustrated in FIGS. 1 to 5, a vehicle 1 to which a roof apparatus for a vehicle according to the present embodiment is applied includes a rear body 12 connected to a roof 11 and substantially extending in a vertical direction of the vehicle 1. Joint recess portions 13 (left and right joint recess portions 13) are formed at left and right end portions 11c (first and second end portions) of the roof 11 in a width direction of the vehicle 1 so as to connect a roof top panel 11a and each roof side panel 11b constituting the roof 11. The joint recess portions 13 accommodate respective roof molding members 2 (left and right roof molding members 2) each serving as a projecting member and functioning as an appearance functional member of the vehicle 1. The joint recess portions 13 are sealed by the respective roof molding members 2 so as to ensure the appearance of the vehicle 1.

Figure 2:
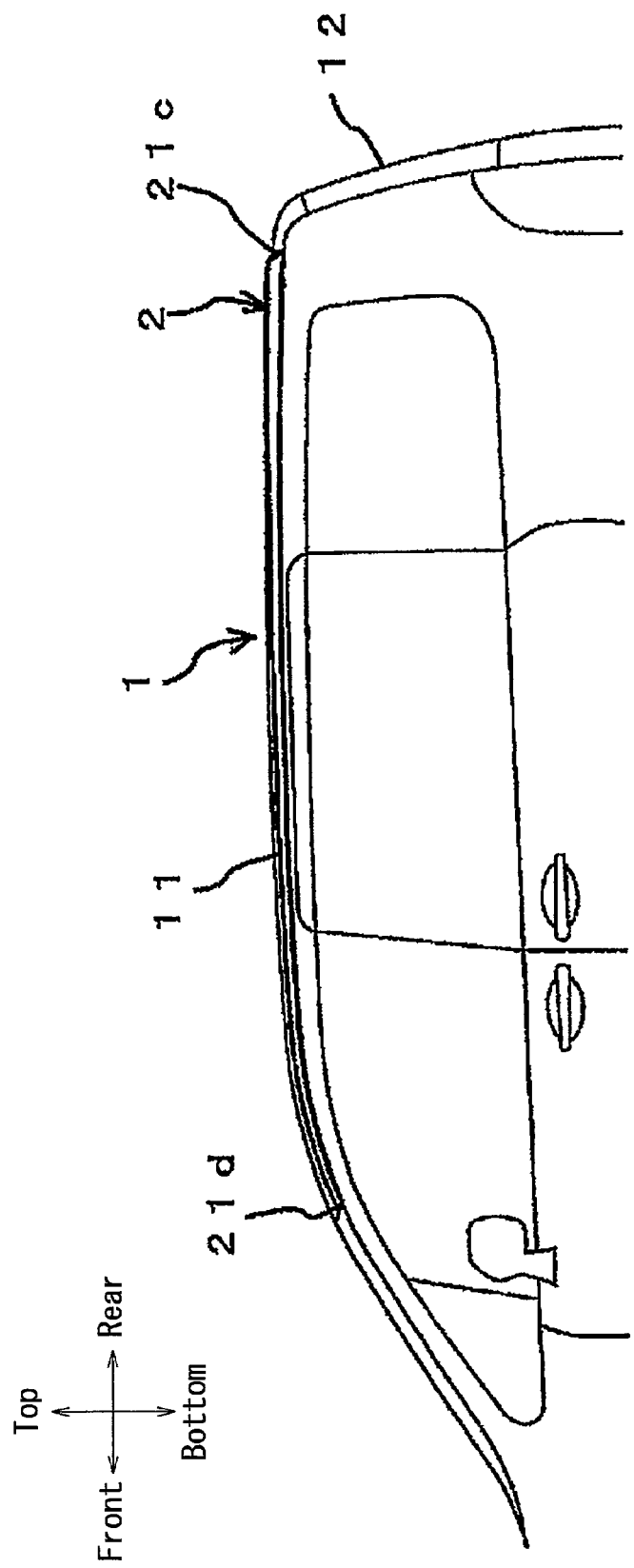
FIG. 2 is an enlarged view illustrating a side surface of the vehicle illustrated in FIG. 1.
Figure 4:
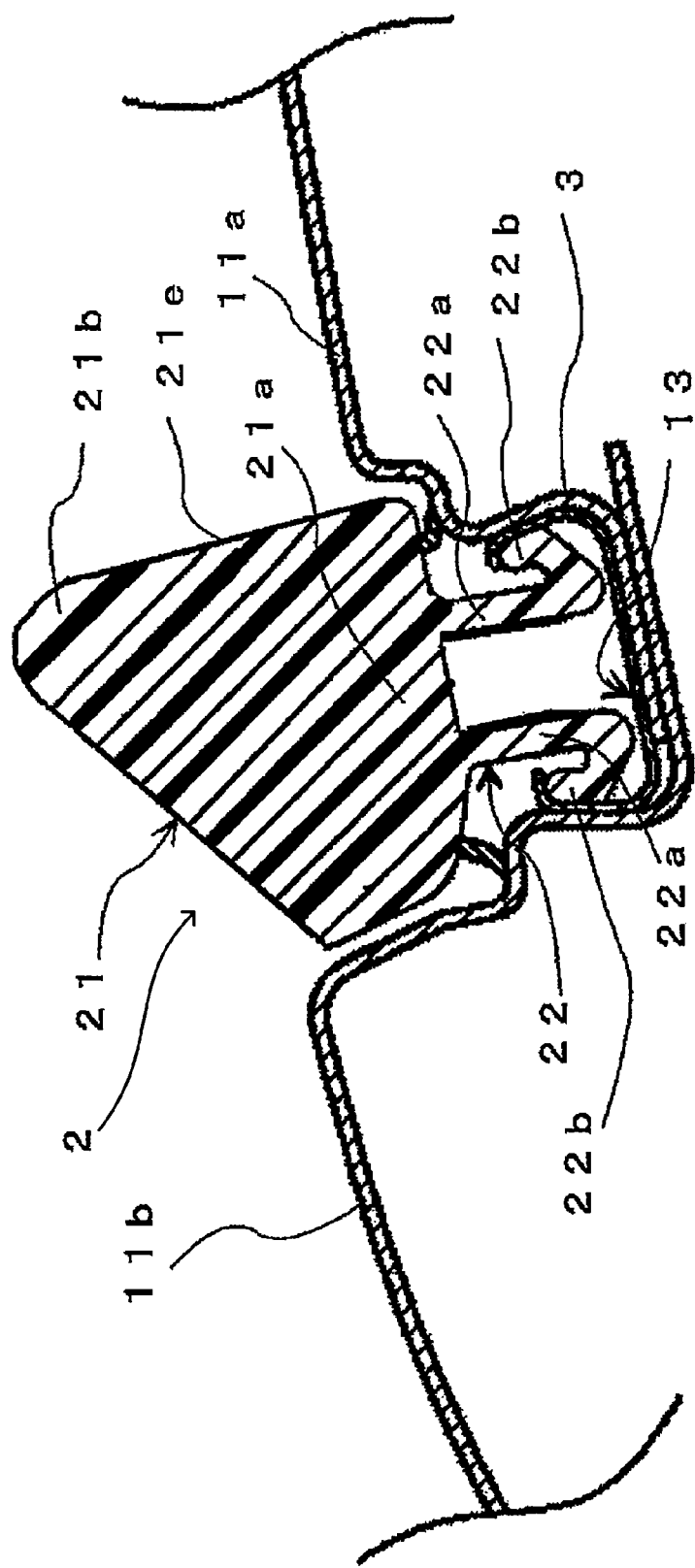
FIG. 4 is a cross-sectional view taken along a line IV-IV in FIG. 3.
Figure 5:
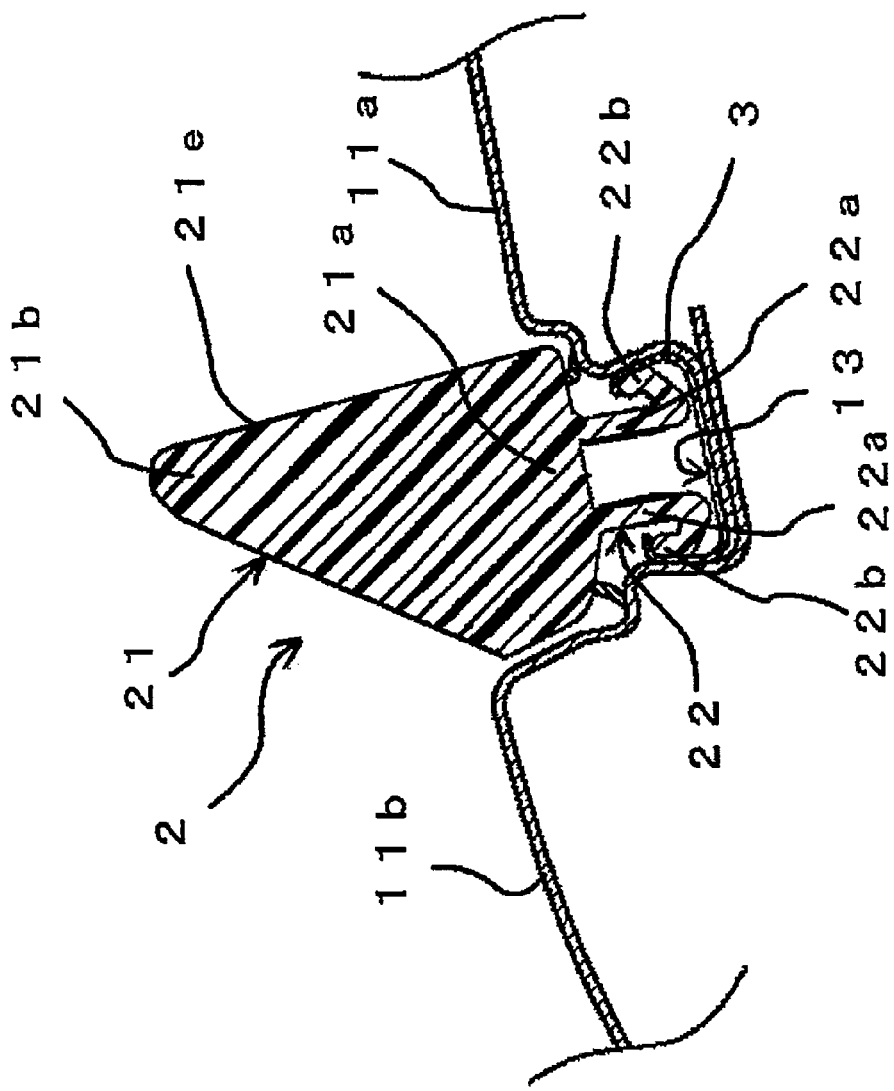
FIG. 5 is a cross-sectional view taken along a line in V-V FIG. 3.

As illustrated in FIGS. 2, 4, and 5, each of the roof molding members 2 provided at opposite ends of the roof 11 in the width direction is formed into an elongated shape and made of synthetic resin. Each of the roof molding members 2 integrally includes a body portion 21 at an upper side and an attachment portion 22 at a lower side.

The body portion 21 which is a solid body has a fin configuration so that a cross-sectional area of an upper portion 21b of the body portion 21 is smaller than a cross-sectional area of a lower portion 21a of the body portion 21, and a vertical section is substantially formed into a triangular shape as illustrated in FIGS. 4 and 5. The body portion 21 may be a hollow body. The height of the body portion 21 gradually decreases from a first end face 21c serving as a first end portion to a second end face 21d serving as a second end portion in a longitudinal direction of the roof molding member 2. At this time, the height of the body portion 21 is the highest at the first end face 21c and is the lowest at any portion between a center portion and the second end face 21d in the longitudinal direction of the roof molding member 2 to thereby secure the unity (coplanarity) of the roof molding members 2 and the roof 11 at a front portion of the roof 11 in the longitudinal direction thereof. The appearance of the vehicle 1 is ensured accordingly.

The attachment portion 22 of the roof molding member 2 includes a pair of leg portions 22a arranged side by side while having a predetermined interval therebetween. Engagement portions 22b are formed at respective ends of the leg portions 22a while projecting in opposite directions from each other.

Each of the roof molding members 2 having the aforementioned configuration is mounted at the joint recess portion 13 in a state where the engagement portions 22b engage with a metal fitting 3 attached to the bottom of the joint recess portion 13.

As illustrated in FIGS. 1 to 5, the left and right roof molding members 2 mounted at the left and right joint recess portions 13 are arranged at the left and right end portions 11c of the roof 11 in a state where the first end face 21c of each of the roof molding members 2 is positioned at a rear side while the second end face 21d of each of the roof molding members 2 is positioned at a front side of the vehicle 1. Each of the left and right roof molding members 2 extends from a front end to a rear end of the roof 11 in a front and rear direction (i.e., the longitudinal direction) of the vehicle 1.

As illustrated in FIG. 1, the first end face 21c of each of the roof molding members 2 mounted on the roof 11 is positioned at the front side relative to a boundary 14 defined between an outer surface of the roof 11 and an outer surface of the rear body 12. As illustrated in FIG. 5, an upper end of the upper portion 21b of the body portion 21 projects upward relative to a boundary layer of airflow P1 generated during the driving of the vehicle 1. As a result, the left and right roof molding members 2 and an upper surface (the outer surface) of the roof 11 arranged between the left and right roof molding members 2 constitute a guide surface 21e of the airflow P1.

The boundary layer of the airflow P1 corresponds to a portion of the airflow P1 (a boundary layer airflow) having a 40 mm height, for example, from the outer surface of the roof 11 and generating viscosity while being pulled by the roof 11 because of a frictional resistance with the roof 11. The speed of the boundary layer airflow is slow. An upper portion of the airflow P1 flowing through the upper side of the vehicle 1 relative to the boundary layer is called a mainstream of the airflow P1. The mainstream of the airflow P1 flows at a speed substantially same as the speed of the vehicle 1. The airflow P1 is divided into an airflow P2 including the boundary layer as a main component and an airflow P3 including the mainstream as a main component. The airflow P2 flows to the rear side of the vehicle 1 from the boundary 14 between the outer surface of the roof 11 and the outer surface of the rear body 12 so as to be wound downwardly. The airflow P3 flows straight to the rear side of the vehicle 1. The boundary layer of the airflow P1 may have a different height from the 40 mm height depending on the speed or the shape of the vehicle 1, for example.

As illustrated in FIG. 1, a distance between the guide surfaces 21e of the left and right roof molding members 2 gradually increases towards the front side of the vehicle 1 from the vicinity of the first end faces 21c of the left and right roof molding members 2. That is, as illustrated in FIG. 1, a distance L1 between the guide surfaces 21e in the vicinity of the first end faces 21c of the left and right roof molding members 2 is smaller than a distance L2 between the guide surfaces 21e at a substantially center portion in the longitudinal direction of the roof molding members 2 at the front side relative to the first end faces 21c. Distances between the left and right joint recess portions 13 where the left and right roof molding members 2 are mounted are specified in the same way as the left and right roof molding members 2.

Figure 3:
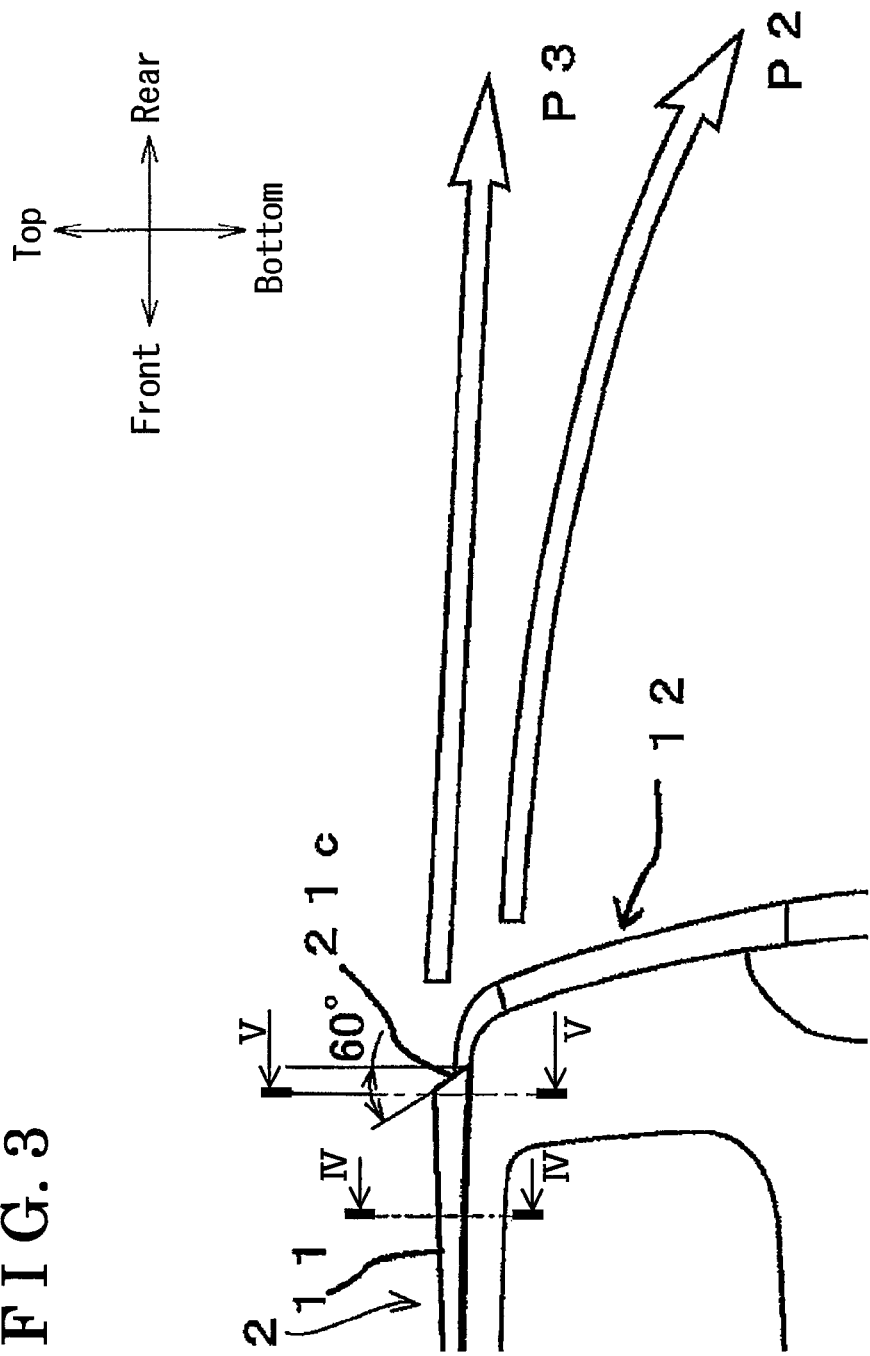
FIG. 3 is an enlarged view illustrating a rear portion of the vehicle illustrated in FIG. 1.

As illustrated in FIG. 3, an upper end of the first end face 21c of each of the left and right roof molding members 2 projects so as to have the same height or greater height relative to the height of an upper end of the boundary layer of the airflow P1. In addition, the upper end of the first end face 21c of each of the left and right roof molding members 2 is positioned rearward of the vehicle 1 relative to a point defined to be 60 degrees forward from an upward vertical line extending from a lower end of the first end face 21c of each of the left and right roof molding members 2.

According to the embodiment, the roof molding member 2 may be replaced by a roof rail (a roof carrier) serving as the projecting member.

An operation of the roof apparatus will be explained below.

While the vehicle 1 is being driven, the airflow P1 flowing on the roof 11 turns to the airflow P2 wound downward of the vehicle 1 at the rear side of the rear body 12, and the airflow P3 flowing straight to the rear side of the vehicle 1 in the rear of the boundary 14 between the outer surface of the roof 11 and the outer surface of the rear body 12. As compared to a roof apparatus for a vehicle not equipped with the roof molding member 2 (the projecting member), according to the present embodiment, the airflow P1 flowing on the roof 11 is started to be guided and regulated by the guide surfaces 21e of the left and right roof molding members 2, and is converged or gathered to a center line of the roof 11 extending in the longitudinal direction thereof from the left and right direction as indicated by arrows in FIG. 1. The speed of the airflow P1 increases as being converged by the left and right roof molding members 2 provided at the left and right end portions 11c of the vehicle 1 in the width direction thereof so that the distance between the left and right roof molding members 2 gradually decreases towards the rear side of the vehicle 1. The airflow P1 of which the speed increases turns to the airflow P2 that is weakened relative to a known roof apparatus and the airflow P3 that is enhanced as illustrated in FIG. 3.

Figure 6A:
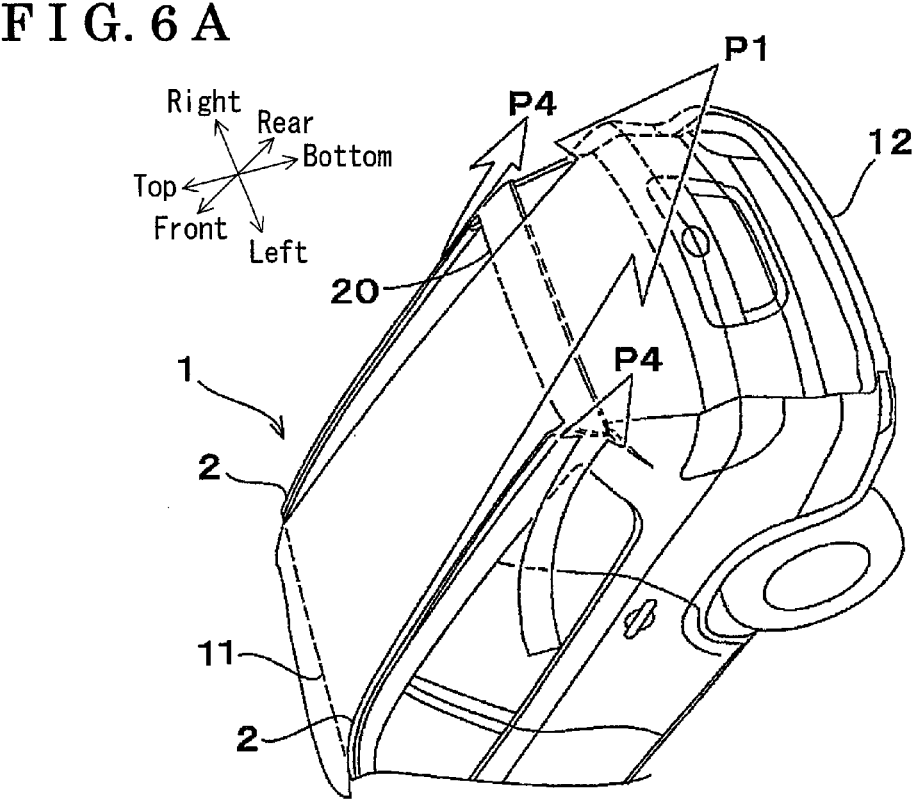
FIG. 6A is an explanatory view explaining whether or not an airflow flowing on a roof and an airflow flowing through side surfaces of the vehicle join each other in a case where left and right roof molding members are equipped.
Figure 6B:
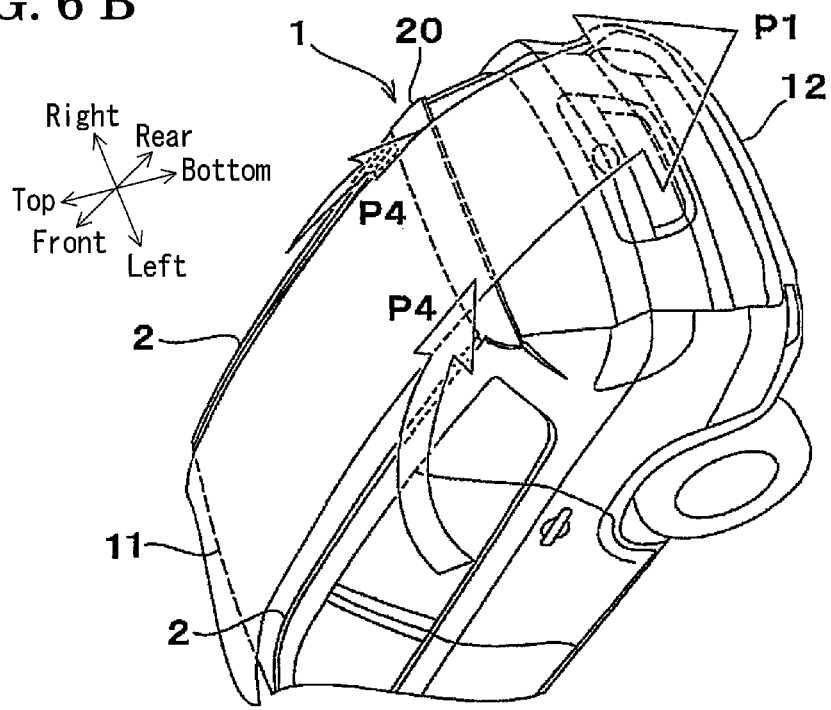
FIG. 6B is an explanatory view explaining whether or not the airflow flowing on the roof and the airflow flowing through the side surfaces of the vehicle join each other in a case where the left and right roof molding members are not equipped.

FIGS. 6A and 6B are explanatory views explaining whether or not the airflow P1 and airflows P4 flowing through respective side surfaces of the vehicle 1 join each other. FIG. 6A is a case where the left and right roof molding members 2 are equipped while FIG. 6B is a case where the left and right roof molding members 2 are not equipped.

In a case where the height of each of the roof molding members 2 is lower than the upper end of the boundary layer of the airflow P1 flowing on the roof 11 or the roof molding members 2 are nor provided, the airflows P4 flowing through the side surfaces of the vehicle 1 and having the speed substantially the same as the speed of the vehicle 1 join the boundary layer of the airflow P1 flowing on the roof 11 and having the low speed while the vehicle 1 is being driven. Thus, a vortex is generated in the airflow P1 because of turbulence that occurs in association with the join of the airflows P1 and P4. A leeward side of a point where the airflows P1 and P4 join tends to become a negative pressure so that the rear body 12 of the vehicle 1 is pulled to the leeward side. Then, the airflow P3 flowing straight to the rear side of the vehicle 1 is further weakened and the airflow P2 flowing downward of the vehicle 1 is further enhanced. On the other hand, according to the embodiment, the height of each of the roof molding members 2 is equal to or greater than the height of the upper end of the boundary layer of the airflow P1 flowing on the roof 11. Therefore, the airflows P4 are inhibited from joining the airflow P1 on the roof 11. The vortex is unlikely to be generated in the airflow P1 and the leeward side of the point where the airflows P1 and P4 join is unlikely to become the negative pressure so that the rear body 12 is unlikely to be pulled to the leeward side. Further, the airflow P3 may be inhibited from being further weakened while the airflow P2 may be inhibited from being further enhanced.

In FIG. 3, the upper end of the first end face 21c of each of the left and right roof molding members 2 projects so as to have the same height or greater height relative to the height of the upper end of the boundary layer of the airflow P1. In addition, the upper end of the first end face 21c of each of the left and right roof molding members 2 is positioned rearward of the vehicle 1 relative to the point defined to be 60 degrees forward from the upward vertical line extending from the lower end of the first end face 21c of each of the left and right roof molding members 2. Thus, the airflows P4 are unlikely to join the airflow P1 at the rear side of the roof molding members 2. The airflow P3 is further unlikely to be weakened while the airflow P2 is further unlikely to be enhanced.

Next, effects of the embodiment will be explained below.

According to the roof apparatus of the aforementioned embodiment, the airflows P4 flowing through the side surfaces of the vehicle 1 is restrained from joining the boundary layer of the airflow P1 flowing through the outer surface of the roof 11 at the low speed. A possible vortex that may be generated at the leeward side of the roof molding members 2 because of the join of the airflows P1 and P4 is restrained. Thus, the rear body 12 of the vehicle 1 is inhibited from being pulled rearward by the vortex and the fuel consumption is inhibited from being deteriorated. A high pressure range increases (i.e., an influence of the negative pressure by the vortex is weak) and also the atmospheric pressure may partially increase (i.e., the degree of negative pressure is reduced) at the rear side of the rear body 12 i.e., at the leeward side of the roof molding members 2. The rear side of the rear body 12 at the leeward side of the roof molding members 2 is inhibited from tending to be the negative pressure and the rear body 12 is inhibited from being pulled to the leeward side. That is, a coefficient of air resistance of the vehicle 1 as a whole is reduced to thereby further inhibit the deterioration of the fuel consumption. In addition, because the rear side of the rear body 12 at the leeward side of the roof molding members 2 is inhibited from tending to be the negative pressure, a splash of mud from a forward vehicle across the roof 11 of the vehicle 1 or from the lower side of the vehicle 1 (the own vehicle), or diesel exhaust gas, for example, is retrained from being suctioned in the vicinity of the outer surface of the rear body 12 by the negative pressure. Adhesion of dirt to the surface of the rear body 12 and/or to a clearance between the rear body 12 and a trunk, for example, may be reduced.

Figure 7A:
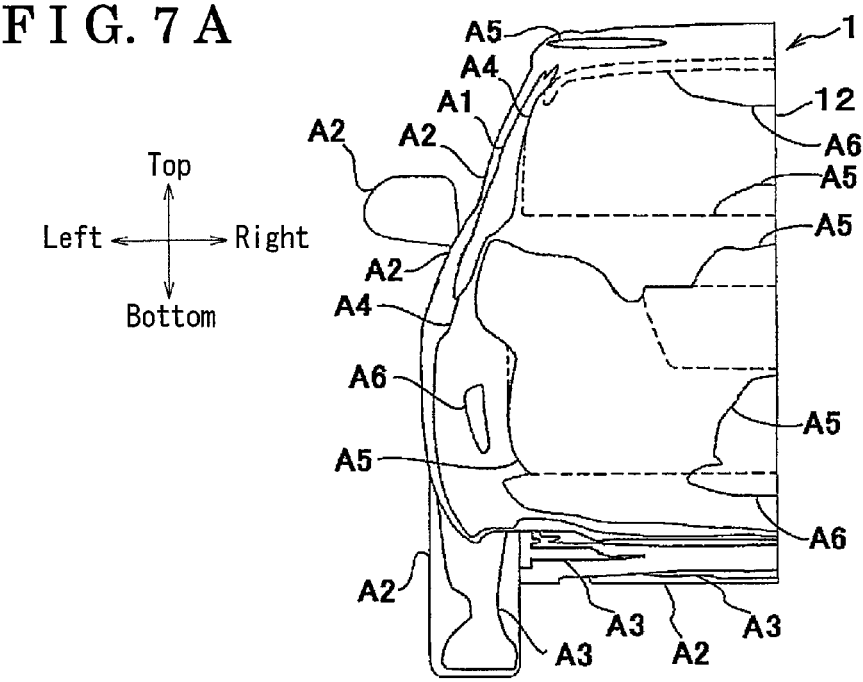
FIG. 7A is a pressure distribution chart of the rear portion of the vehicle in a case where the roof molding members are provided at the vehicle.
Figure 7B:
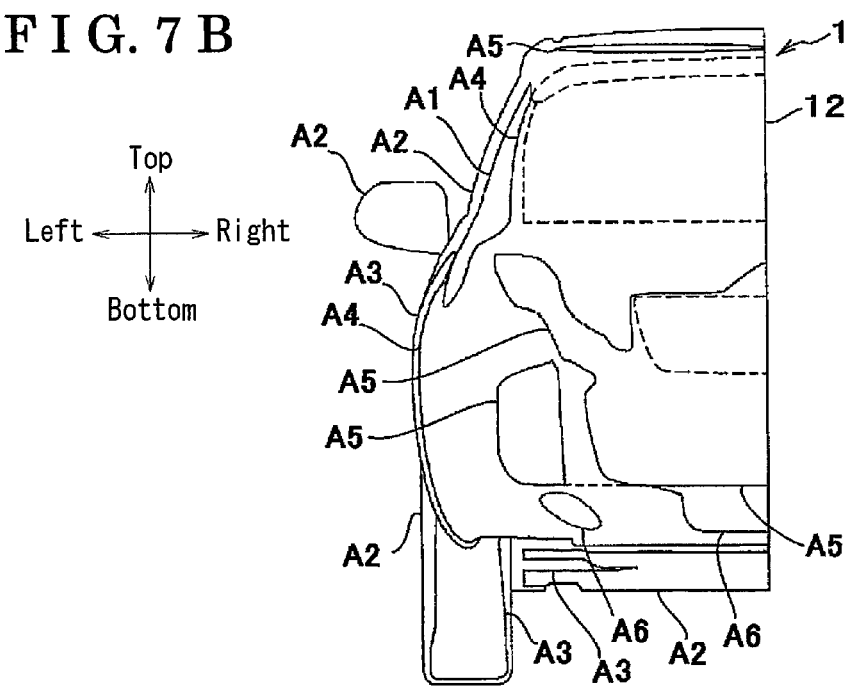
FIG. 7B is a pressure distribution chart of the rear portion of the vehicle in a case where the roof molding members 2 are not provided at the vehicle.
Figure 7B:
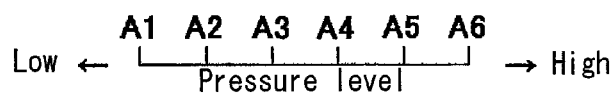

FIG. 7A illustrates a pressure distribution chart in a case where the roof molding members 2 are provided at the vehicle. FIG. 7B illustrates a pressure distribution chart in a case where the roof molding members 2 are not provided at the vehicle. According to the vehicle including the roof molding members 2, the high pressure range increases and also the pressure partially increases at the rear side of the rear body 12 compared to the vehicle not including the roof molding members 2. Therefore, the rear side of the rear body 12 at the leeward side of the roof molding members 2 is inhibited from tending to be the negative pressure and the rear body 12 is inhibited from being pulled to the leeward side.

In addition, the left and right roof molding members 2 are arranged at the left and right end portions 11c of the roof 11 in the width direction of the vehicle 1. Thus, the roof molding members 2 or the roof rails may be likely to function as a meaningful appearance design component of the vehicle 1 (i.e., it may be easy for a person who sees the roof molding members 2 or the roof rails to recognize them as the appearance design component or the functional component). As compared to a known roof apparatus for a vehicle, an adverse effect on the appearance of the vehicle 1 may be restrained.

According to the roof apparatus of the embodiment, a collision of the upper portion 21b or the second end face 21d of each of the roof molding members 2 relative to air and the occurrence of vortex because of air turbulence are reduced to thereby further restrain the deterioration of fuel consumption. In addition, the roof molding members 2 or the roof rails may be likely to function as the appearance design component of the vehicle while a streamline shape of each of the roof molding members 2 is ensured. As compared to a known roof apparatus for a vehicle, the adverse effect on the appearance of the vehicle 1 may be restrained.

According to the roof apparatus of the embodiment, a connection surface between each of the roof molding members 2 and the roof top panel 11a and a connection surface between each of the roof molding members 2 and the roof side panel 11b are obtained by smooth arc-shaped cross sections respectively. Thus, the roof molding members 2 or the roof rails are likely to function as the appearance design component of the vehicle. As compared to a known roof apparatus for a vehicle, the adverse effect on the appearance of the vehicle 1 may be restrained. Further, each of the roof molding members 2 is connected to the roof top panel 11a without a step while each of the roof molding members 2 is connected to the roof side panel 11b without a step. As a result, the possible vortex caused by the air turbulence at the step may be reduced and the deterioration of fuel consumption may be further inhibited.

According to the roof apparatus of the embodiment, at the first end face 21c of each of the left and right roof molding members 2, the airflow flowing above the boundary layer at the high speed is inhibited from joining the airflow flowing away from the boundary layer through each of the side surfaces of the vehicle 1 at the high speed. Thus, the vortex is inhibited from being generated at the leeward side of the roof molding members 2 and the rear body 12 is inhibited from being pulled to the leeward side because of the negative pressure at the leeward side of the roof molding members 2. That is, the deterioration of fuel consumption is further inhibited. In addition, the roof molding members 2 or the roof rails may be likely to function as the appearance design component of the vehicle while the streamline shape of each of the roof molding members 2 is ensured. As compared to a known roof apparatus for a vehicle, the adverse effect on the appearance of the vehicle 1 may be restrained.

According to the roof apparatus of the embodiment, the deterioration of the appearance of the vehicle 1 may be restrained that is caused by a small displacement of the first end face 21c of each of the left and right roof molding members 2 relative to the boundary between the outer surface of the roof 11 and the outer surface of the rear body 12. Further, a preparation of a tool or man-hours for precisely positioning the first end face 21c of each of the left and right roof molding members 2 to the boundary between the outer surface of the roof 11 and the outer surface of the rear body 12 may be eliminated.

According to the roof apparatus of the embodiment, the airflow P4 flowing through each of the side surfaces of the vehicle 1 is inhibited from joining the boundary layer of the airflow P1 flowing through the outer surface of the roof 11 at the low speed. The occurrence of vortex is restrained at the leeward side of the roof molding members 2 because of the joining of the airflows P1 and P4. Thus, the rear body 12 is restrained from being pulled rearward by the vortex. The deterioration of the fuel consumption may be inhibited accordingly. In addition, because the left and right roof molding members 2 are arranged at the left and right end portions 11c of the roof 11, the roof molding members 2 are likely to function as the appearance design components. As compared to a known roof apparatus for a vehicle, the adverse effect on the appearance of the vehicle 1 may be restrained.

The aforementioned effects may be obtained by the vehicle equipped with a rear spoiler 20 as illustrated in FIGS. 6A, 6B, 7A, and 7B.

According to the roof apparatus of the embodiment, the distance between the left and right roof molding members 2 gradually decreases towards the first end face 21c (towards the rear side of the vehicle 1). Thus, the speed of the airflow P1 flowing on the roof 11 is further enhanced and the airflow P3 flowing straight to the rear side of the vehicle 1 may be further enhanced. Then, the airflow P1 flowing on the roof 11 may cause the airflow P2 flowing downwardly of the vehicle 1 to be weaken or reduced. The generation of vortex at the leeward side of the roof molding members 2 is restrained. Accordingly, the rear body 12 is inhibited from being pulled rearward because of the vortex and the deterioration of the fuel consumption is inhibited.

According to the roof apparatus of the embodiment, the first end face 21c of each of the roof molding members 2 overlaps a front end face of a leg portion of the rear spoiler 20 when viewed from the side of the vehicle 1.

Accordingly, the airflow P4 flowing through each of the side surfaces of the vehicle 1 is unlikely to join the airflow P1 flowing on the roof 11 at the rear side of the roof molding members 2. Thus, the airflow P3 is further unlikely to be weakened while the airflow P2 is further unlikely to be enhanced. That is, the rear side of the rear body 12 at the leeward side of the roof molding members 2 is inhibited from tending to be the negative pressure and the rear body 12 is inhibited from being pulled to the leeward side. The deterioration of the fuel consumption may be restrained. Further, the roof molding members 2 may be easily associated with the meaningful functional member arranged on the roof 11 so as to extend in the longitudinal direction of the vehicle 1, thereby restraining the deterioration in appearance of the vehicle 1.

According to the aforementioned embodiment, each of the left and right roof molding members 2 includes the fin configuration so that the cross-sectional area of the upper portion 21b of each of the roof molding members 2 projecting relative to the boundary layer is smaller than the cross-sectional area of the lower portion 21a of each of the roof molding members 2 mounted on the roof 11, and so that the height of each of the roof molding members 2 gradually decreases from the first end face 21c to the second end face 21d of each of the roof molding members 2, the first end face 21c and the second end face 21d being positioned at the rear side and the front side of the vehicle 1 respectively.

In addition, according to the aforementioned embodiment, each of the left and right roof molding members 2 includes the roof molding member or the roof rail mounted at the joint recess portion 13 that is formed between the roof top panel 11a and the roof side panel 11b constituting the roof 11.

Further, according to the aforementioned embodiment, each of the left and right roof molding members 2 is arranged in a state where the upper end of the first end face 21c is positioned rearward of the vehicle 1 relative to the point defined to be 60 degrees forward from the upward vertical line extending from the lower end of the first end face 21c.

Furthermore, according to the aforementioned embodiment, the first end face 21c of each of the left and right roof molding members 2 is positioned forward of the vehicle 1 relative to the boundary 14 between the outer surface of the roof 11 and the outer surface of the rear body 12 of the vehicle 1.

Furthermore, according to the aforementioned embodiment, each of the left and right roof molding members 2 extends from the front end to the rear end of the roof 11 in the front and rear direction of the vehicle 1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
   first and second projecting members each mounted on a roof of the vehicle and each including an elongated shape,
   the first and second projecting members being arranged at first and second side end portions of the vehicle in a width direction of the vehicle, wherein
   a height of each of the first and second projecting members is equal to or greater than a height of an upper end of a boundary layer of an airflow flowing on the roof when the vehicle is traveling at at least some vehicle speeds, each of the first and second projecting members extends from a front end to a rear end of the roof in a front and rear direction of the vehicle, each of the first and second protecting members includes a first end portion positioned at a rear end of the vehicle and a second end portion positioned at a front end of the vehicle, and a distance between the first and second projecting members gradually increases from the first end portions to the second end portions.

2. The roof apparatus according to claim 1, wherein each of the first and second projecting members includes a fin configuration so that a cross-sectional area of an upper portion of each of the first and second projecting members projecting relative to the boundary layer is smaller than a cross-sectional area of a lower portion of each of the first and second projecting members mounted on the roof, and so that the height of each of the first and second projecting members gradually decreases from the first end portion to the second end portion of each of the first and second projecting members.

3. The roof apparatus according to claim 1, wherein each of the first and second projecting members includes a roof molding member or a roof rail mounted at a joint recess portion that is formed between a roof top panel and a roof side panel constituting the roof.

4. The roof apparatus according to claim 1, wherein:

each of the first and second projecting members includes a first end face positioned at a rear side of the vehicle, and each of the first and second projecting members is arranged in a state where an upper end of the first end face is positioned to extend in a direction toward a front of the vehicle to a point defined to be 60 degrees from an upward vertical line extending from a lower end of the first end face.

5. The roof apparatus according to claim 1, wherein a first end portion of each of the first and second projecting members is positioned forward of the vehicle relative to a boundary between an outer surface of the roof and an outer surface of a rear body of the vehicle.

6. The roof apparatus according to claim 3, wherein each of the roof molding members or roof rails includes an integrally formed attachment portion for attaching to the joint recess portion.

7. The roof apparatus according to claim 6, wherein:

each of the attachment portions includes a pair of leg portions and a pair of engagement portions projecting outwardly from the pair of leg portions in opposite directions from each other, and each of the roof molding members or roof rails are mounted to the joint recess portion in a state where the engagement portions engage with a metal fitting attached to the bottom of the joint recess portion.

8. The roof apparatus according to claim 4, wherein the first end face of each of the first and second projecting members overlaps a front end face of a leg portion of a rear spoiler when viewed from a side of the vehicle.

9. A roof apparatus for a vehicle, comprising:

first and second projecting members each mounted on a roof of the vehicle and each including an elongated shape, the first and second projecting members being arranged at first and second side end portions of the vehicle in a width direction of the vehicle, wherein a height of each of the first and second projecting members is equal to or greater than a height of an upper end of a boundary layer of an airflow flowing on the roof when the vehicle is traveling at at least some vehicle speeds, each of the first and second projecting members extends from a front end to a rear end of the roof in a front and rear direction of the vehicle, each of the first and second projecting members includes a roof molding member or a roof rail mounted at a joint recess portion that is formed between a roof top panel and a roof side panel constituting the roof, each of the roof molding members or roof rails includes an integrally formed attachment portion for attaching to the joint recess portion, each of the attachment portions includes a pair of leg portions and a pair of engagement portions projecting outwardly from the pair of leg portions in opposite directions from each other, and each of the roof molding members or roof rails are mounted to the joint recess portion in a state where the engagement portions engage with a metal fitting attached to the bottom of the joint recess portion.

\* \* \* \* \*